United States Patent
Doorn

(10) Patent No.: US 8,372,310 B2
(45) Date of Patent: Feb. 12, 2013

(54) PROCESS FOR THE PREPARATION OF SYNTHESIS GAS, II

(75) Inventor: Siebolt Doorn, Spijk (NL)

(73) Assignee: Gelato Corporation N.V., Curacao (AN)

( * ) Notice: Subject to any disclaimer, the term of this patent is extended or adjusted under 35 U.S.C. 154(b) by 0 days.

(21) Appl. No.: 12/921,913

(22) PCT Filed: Mar. 10, 2009

(86) PCT No.: PCT/EP2009/052760
§ 371 (c)(1),
(2), (4) Date: Sep. 10, 2010

(87) PCT Pub. No.: WO2009/112476
PCT Pub. Date: Sep. 17, 2009

(65) Prior Publication Data
US 2011/0006262 A1    Jan. 13, 2011

(30) Foreign Application Priority Data
Mar. 10, 2008   (EP) .................................. 08004336

(51) Int. Cl.
*C01B 3/38* (2006.01)
*C01B 3/24* (2006.01)

(52) U.S. Cl. ........................................ 252/373; 423/650

(58) Field of Classification Search .................... 252/373
See application file for complete search history.

(56) References Cited

U.S. PATENT DOCUMENTS 7,294,225 B2 * 11/2007 Landaly et al. ................. 162/16
2007/0293713 A1 * 12/2007 Schmidt et al. ............... 585/658

FOREIGN PATENT DOCUMENTS

WO    WO 2008/028670 A2    3/2008

OTHER PUBLICATIONS

P.J. Dauenhauer et al., "Renewable hydrogen by autothermal steam reforming of volatile carbohydrates," *Journal of Catalysis*, vol. 244, pp. 238-247, 2006.
S. Czernik et al., "Hydrogen by Catalytic Steam Reforming of Liquid Byproducts from Biomass Thermoconversion Processes," *Ind. Eng. Chem. Res.*, vol. 41, pp. 4209-4215, 2002.
T. Valliyappan et al., "Hydrogen or Syn Gas Production from Glycerol Using Pyrolysis and Steam Gasification Processes," Dec. 2004.
Written Opinion of the International Searching Authority dated Jun. 12, 2009 in International Patent Application No. PCT/EP2009/052760.
International Preliminary Report on Patentability dated Jun. 12, 2009 in International Patent Application No. PCT/EP2009/052760.
International Search Report dated Jun. 12, 2009 in International Patent Application No. PCT/EP2009/052760.

\* cited by examiner

*Primary Examiner* — Melvin C Mayes
*Assistant Examiner* — Kenneth Vaden
(74) *Attorney, Agent, or Firm* — Oliff & Berridge, PLC

(57) ABSTRACT

A process for the production of synthesis gas is presented, which involves the steps of a) preparing a vapor phase mixture comprising steam and at least one hydrocarbon or oxygenated hydrocarbon by atomizing of the at least one hydrocarbon or oxygenated hydrocarbon through a nozzle such that the at least one hydrocarbon or oxygenated hydrocarbon is present as droplets with a droplet size of less than 500 μm and the time to complete evaporation does not exceed 0.5 seconds, said at least one hydrocarbon or oxygenated hydrocarbon having an atmospheric boiling point in the range of −50 to 370° C., said vapor phase having a $H_2O/C$ molar ratio of at least 2, and b) catalytic conversion of the vapor phase mixture into synthesis gas in a reformer.

11 Claims, No Drawings

PROCESS FOR THE PREPARATION OF SYNTHESIS GAS, II

The invention pertains to a process for preparation of synthesis gas.

PCT/EP2007/007798 discloses a process for the production of synthesis gas from hydrocarbons or oxygenated hydrocarbons subsequently followed by the production of methanol or other products starting from hydrocarbons or oxygenated hydrocarbons as the feedstock, alone or together with natural gas. The preparation of the hydrocarbons or oxygenated hydrocarbons before entering the reformer should take place by steam evaporation. In this description it is said that the steam ($H_2O$) to carbon ratio should have a value of at least 2, preferably at least 2.5 on a molar basis and most preferably 3.2.

The present invention relates to the production of synthesis gas directly from traditionally purified hydrocarbons or oxygenated hydrocarbons, preferably from glycerol. The hydrocarbons or oxygenated hydrocarbons may be obtained via the several well known routes, such as vacuum distillation or extraction, starting from e.g. crude glycerol coming from the vegetable oil industry, animal fats, used cooking oil and the like.

As mentioned in the prior art the steam to carbon ratio is very important to avoid the formation of carbon in the tubes or pipes or upon the catalyst. The chosen preparation there keeps the hydrocarbons or oxygenated hydrocarbons surrounded by enough steam during the evaporation and heating up to the desired temperatures for entering a reformer. As steam is absent in the traditional purification of e.g. glycerol, one chooses vacuum distillation, avoiding high temperatures this way.

For reforming pressures of 10-20 bar are needed and temperatures are kept around 300° C.-700° C. Therefore, purification by vacuum distillation will not be an economical solution especially not when huge amounts have to be processed. As glycerol deteriorates at temperatures above 180° C. rather quickly, residence times during which it is exposed to high temperatures will be very important as well.

It is an object of the present invention to provide an alternative to the process for the production of synthesis gas in the prior art. A process that can easily be applied and is economically attractive in the sense that the evaporation route needs less equipment and thus will be more cost effective in the investment. Surprisingly, this object can be achieved by a process for the production of synthesis gas, which involves the steps of
  a) preparing a vapor phase mixture comprising steam and at least one hydrocarbon or oxygenated hydrocarbon by atomizing of the at least one hydrocarbon or oxygenated hydrocarbon through a nozzle such that the at least one hydrocarbon or oxygenated hydrocarbon is present as droplets with a droplet size of less than 500 μm and the time to complete evaporation does not exceed 0.5 seconds, said at least one hydrocarbon or oxygenated hydrocarbon having an atmospheric boiling point in the range of −50 to 370° C., said vapor phase having a $H_2O$/C molar ratio of at least 2, and
  b) catalytic conversion of the vapor phase mixture into synthesis gas in a reformer.

Preferably, one or more oxygenated hydrocarbons are used as feedstock, even more preferably the oxygenated hydrocarbon is glycerol.

For the inventive process glycerol can be pure glycerol or glycerol containing some water and/or having a light yellowish/brownish color as a feedstock.

The $H_2O$/C molar ratio of the vapor phase mixture ranges preferably from 2.5 to 4.

It is preferred that the vapor phase mixture is mixed with natural gas prior to its catalytic conversion to synthesis gas.

The droplets are generated by atomizing of the at least one hydrocarbon or oxygenated hydrocarbon through a nozzle and have a size of less than 500 μm, preferably less than 200 μm and most preferably less than 100 μm.

Preferably the droplets are generated with an atomizing nozzle, which is aided by steam.

Even more preferably the steam to carbon ratio in the nozzle is at least 2.0, and most preferably all the steam is fed through the nozzle.

In the process of the present invention the hydrocarbon or oxygenated hydrocarbon, e.g. glycerol, is evaporated by a combination of atomizing via a nozzle supported by steam. Cold or gently preheated hydrocarbon or oxygenated hydrocarbon to less than 180° C., e.g. glycerol, is fed to a nozzle with steam chambers followed by a heating device. It is surprisingly found that the drop size may not exceed 500 μm, preferably may not exceed 200 μm and most preferably may not exceed 100 μm and the time to complete evaporation should not exceed 0.5 seconds and preferably should not exceed 0.3 seconds. If the drop size is chosen to be less than 500 μm and if the evaporation time is chosen not to exceed 0.5 seconds it was surprisingly found that no degradation of the hydrocarbon or oxygenated hydrocarbon, e.g. glycerol, and no carbon-formation occurs.

However, if the drop size exceeds 500 μm and if the evaporation time exceeds 0.5 seconds it was found that degradation of the hydrocarbon or oxygenated hydrocarbon, e.g. glycerol, and carbon-formation occurs.

The overall steam to carbon ratio will be kept the same as in the prior art, such as disclosed in PCT/EP2007/007798. All the steam is preferably given to the said atomizing nozzle. If nevertheless natural gas is fed together with glycerol to the reformer the steam may be divided over both streams, but the steam to carbon ratio in the nozzle should be at least 2.0 on a molar basis. Under these circumstances any ratio of methane and glycerol can be fed to the reformer. Glycerol can be fed solely as well.

All other conditions, catalysts and apparatus are kept the same as in the prior art PCT/EP2007/007798, which is herein incorporated by reference in its entirety. For example, there is no addition of oxygen as described in the prior art; instead, the oxygen is present only in bonded form. Elemental oxygen is absent in the instant process. Oxygen is only supplied by the water (steam) molecule or is present in the oxygenated hydrocarbons, such as in the glycerol. The synthesis gas mainly is meant for the production of methanol, where it is also fit for production of dimethyl ether (DME), olefins, alkanes, fuel products and the like.

The invention claimed is:

1. Process for the production of synthesis gas, which involves the steps of
  a) preparing a vapor phase mixture consisting of
    steam and
    at least one atomized hydrocarbon or oxygenated hydrocarbon, and
  b) catalytic conversion of the vapor phase mixture into synthesis gas in a reformer,
  wherein
    the vapor phase mixture does not contain elemental oxygen, and oxygen in the vapor phase mixture is supplied by the water of the steam or is present in the oxygenated hydrocarbon, the vapor phase mixture is prepared by atomizing of the at least one hydrocarbon or oxygenated hydrocarbon through a nozzle such that the at least one hydrocarbon or oxygenated hydrocarbon is present as droplets with a droplet size of less than 500 μm and the time to complete evaporation does not exceed 0.5 seconds, said at least one hydrocarbon or oxygenated hydrocarbon having an atmospheric boiling point in the range of −50 to 370° C. said vapor phase having a $H_2O/C$ molar ratio of at least 2, the nozzle that generates the droplets is an atomizing nozzle that is aided by steam, and the at least one hydrocarbon or oxygenated hydrocarbon is at a temperature of less than 180° C. and is fed to the nozzle with steam chambers followed by a heating device.

2. The process of claim 1, wherein one or more oxygenated hydrocarbons are used.

3. The process according to claim 2, wherein the oxygenated hydrocarbon is glycerol.

4. The process according to claim 3, wherein the glycerol is pure glycerol or glycerol containing some water and/or having a light yellowish/brownish color as a feedstock.

5. The process according to claim 1, wherein the $H_2O/C$ molar ratio of the vapor phase mixture ranges from 2.5 to 4.

6. The process according to claim 1, wherein the vapor phase mixture is mixed with natural gas prior to its catalytic conversion to synthesis gas.

7. The process according to claim 1, wherein the droplets have a size of less than 200 μm.

8. The process according to claim 7, wherein the droplets have a size of less than 100 μm.

9. The process according to claim 1, wherein the steam to carbon ratio in the nozzle is at least 2.0.

10. The process according to claim 9, wherein all the steam is fed through the nozzle.

11. The process according to claim 1, wherein the synthesis gas is used for producing methanol.

\* \* \* \* \*